United States Patent [19]
Thompson et al.

[11] Patent Number: 6,083,436
[45] Date of Patent: Jul. 4, 2000

[54] APPARATUS AND TECHNIQUE FOR MAKING CARBON BRAKE DISCS

[75] Inventors: William D. Thompson; Theodore W. Sundburg, both of Canton; David R. Snyder, Cuyahoga Falls, all of Ohio

[73] Assignee: Aircraft Braking Systems Corp., Akron, Ohio

[21] Appl. No.: 09/280,149

[22] Filed: Mar. 26, 1999

[51] Int. Cl.⁷ .................................................. B29C 43/02
[52] U.S. Cl. ............................ 264/81; 264/109; 264/128
[58] Field of Search ............................... 264/81, 82, 109, 264/128

[56] References Cited

U.S. PATENT DOCUMENTS

| | | | |
|---|---|---|---|
| 5,217,657 | 6/1993 | Engle | 264/81 |
| 5,472,650 | 12/1995 | Johnson et al. | 264/81 |
| 5,686,117 | 11/1997 | Snyder et al. | 264/81 |
| 5,837,081 | 11/1998 | Ting et al. | 264/81 |

*Primary Examiner*—Mary Lynn Theisen
*Attorney, Agent, or Firm*—Renner, Kenner, Greive, Bobak, Taylor & Weber

[57] ABSTRACT

A method and apparatus for making carbon/carbon composite discs for an aircraft brake employs a continuous feeding of fiber strands into a mold. Water is then combined with the fibers and the fibers are compressed to form a moisturized mat or preform. The fibers are then needled such that the fibers within the mat or preform extend in radial, circumferential, and axial directions. The mat or preform is then subjected to densification. The resulting disc is of total carbon construction. The water introduced into the mat during the processing serves as both a sacrificial binder and a lubricant during the fabrication.

12 Claims, 1 Drawing Sheet

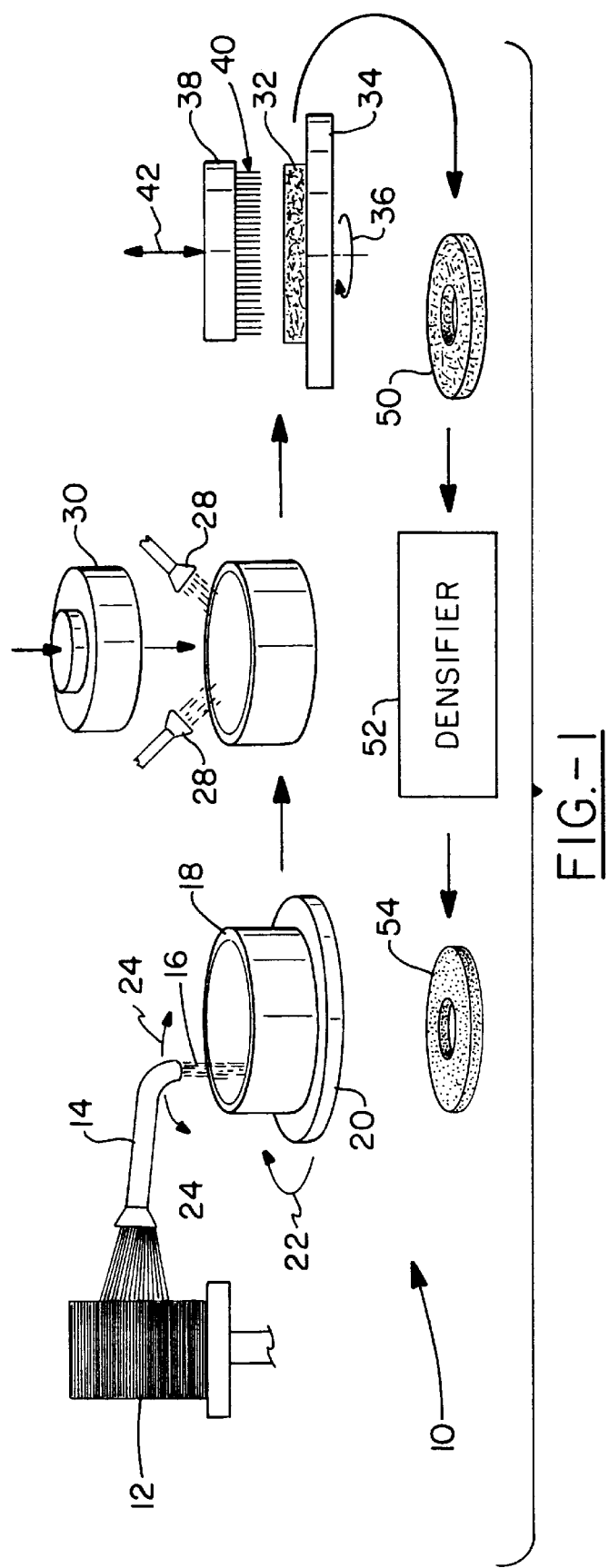
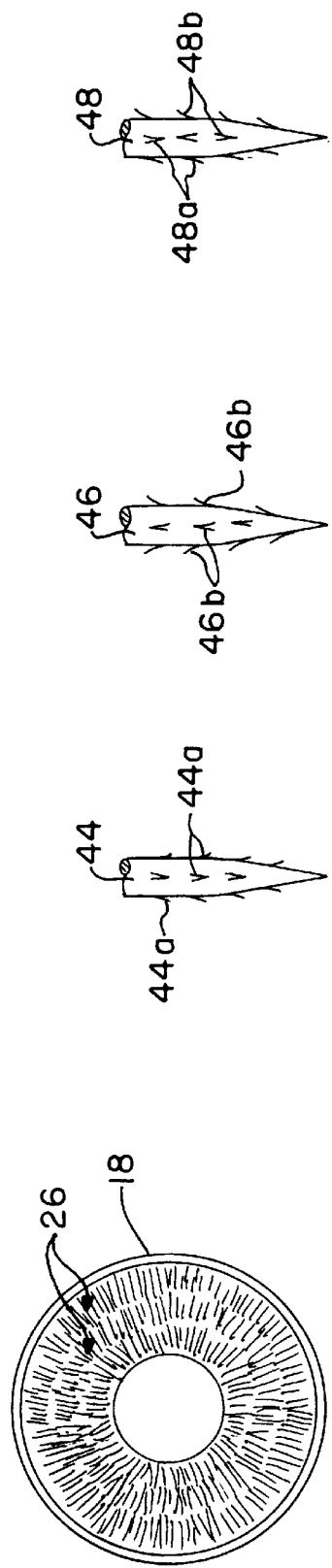
FIG.-1
FIG.-2
FIG.-3A
FIG.-3B
FIG.-3C

APPARATUS AND TECHNIQUE FOR MAKING CARBON BRAKE DISCS

TECHNICAL FIELD

The invention herein resides in the art of aircraft braking systems and, more particularly, to carbon brake discs employed in the brake disc stacks thereof. More particularly, the invention relates to a method and apparatus for manufacturing carbon/carbon composite brake discs. Specifically, the invention relates to the manufacture of carbon/carbon composite brake discs from either precarbonized or carbonized PAN, pitch, or a combination of PAN and pitch fibers. Moreover, the invention relates to the method of manufacturing carbon/carbon composite brake discs of such fibers which are needled to form a three dimensional fiber array within the disc.

BACKGROUND ART

The use of carbon fiber/carbon matrix composite disc brakes, commonly referred to as carbon/carbon composite disc brakes in the aircraft industry is extensively known. Thermal characteristics and the braking efficiency of such braking systems account for their wide spread acceptance. However, those skilled in the art realize that carbon/carbon composite brakes are expensive, a large portion of the costs incident thereto being the labor intensity required in the manufacture of the carbon/carbon composite discs themselves. Carbon/carbon composite brake discs are formed of fibers which are provided in the form of a tow (bundle of continuous filament) or in a roving (a bundle of many short filaments). These fibers may be derived from either pitch or PAN. Those skilled in the art readily understand that pitch fiber is one in which a thermoplastic derivative of coal tar or petroleum pitch is spun into fiber which is subsequently carbonized by an appropriate technique or method for driving the volatiles therefrom. Poly acryol nitrile filgers, commonly referred to as PAN fibers, are oxidized, carbonized, and appropriately heat treated. Both pitch and PAN fibers are well known and extensively used in the manufacture of carbon/carbon composite discs for aircraft braking systems.

The state of the art for the manufacture of carbon/carbon composite discs for the aircraft industry is fairly shown in Pat. No. 5,686,117. There, an effective method and apparatus for forming such carbon/carbon composite discs is shown. However, the technique of that patent typically requires the use of a resin binder in combination with such fiber. When a resin binder is used, it is necessary to subject the resulting disc to a carbonization step such that the resin itself can be carbonized. If the resin binder can be eliminated, such that the disc itself is formed of carbonatized material, the carbonizing step can be eliminated along with the resins. It will also be appreciated by those skilled in the art that some aircraft brake applications are not conducive to implementation with carbon discs which include a resin base. Resin char is low density carbon and, accordingly when resin is employed, density of the resultant disc is sacrificed. Since mass and density are of paramount importance in the context of brake discs, the reduction or elimination of resin content is most advantageous.

It has further been known that in the prior art processes of manufacturing carbon/carbon composite discs the fibers are typically laid in the radially/circumferentially oriented plane so that the resulting disc is layered or stratified with respect to the fibers themselves. In other words, few if any fibers pass in the axially oriented plane with respect to the disc. As a consequence, structural integrity of the disc is sacrificed.

Accordingly, it is most desired that the fibers used in construction of carbon/carbon composite brake discs lie in radial, circumferential and, axial directions within the discs. This feature can be achieved by needling of the disc prior to densification or carbon vapor infiltration. However, it is well known in the art that carbonized fibers such as the PAN or pitch fibers typically employed in carbon/carbon composite brake manufacturing are not conducive to such needling. In short, carbonized fibers are generally brittle and not given to ease of reorientation from a radial/circumferential plane to an axial plane.

There remains a need in the art for a method and apparatus for making carbon/carbon composite discs for aircraft brake assemblies which use carbonized fibers in a needled mat or preform and to do so without the use of resin binders.

DISCLOSURE OF INVENTION

In light of the foregoing, it is a first aspect of the invention to provide an apparatus and technique for making carbon/carbon composite brake discs which are conducive to implementation with either precarbonized or carbonized PAN, pitch, or a combination of PAN and pitch fibers.

Another aspect of the invention is the provision of an apparatus and technique for making carbon/carbon composite brake discs which employ such fibers in a three dimensional orientation within the disc.

Still a further aspect of the invention is the provision of an apparatus and technique for making carbon/carbon composite brake discs which employ such fibers which are needled into a mat or preform for densification.

Yet a further aspect of the invention is the provision of an apparatus and technique for making carbon/carbon composite brake discs which are capable of implementing either precarbonized or carbonized PAN, pitch, or a combination of PAN and pitch fibers without the use of resin as a binder.

Still a further aspect of the invention is the provision of an apparatus and technique for making carbon/carbon composite brake discs which are easy to employ with state of the art structures and techniques, and which result in discs of structural and functional integrity.

The foregoing and other aspects of the invention which will become apparent as the detailed description proceeds are achieved by a method for making carbon/carbon composite discs for aircraft brakes, comprising: feeding fibers into a mold; introducing a binder onto the said fibers in the mold; compressing the fibers in the mold to form a compressed mat; reciprocatingly driving needles into the compressed mat; and densifying the needled compressed mat by chemical vapor infiltration.

Other aspects of the invention which will become apparent herein are attained by a method for making carbon/carbon composite discs for aircraft brakes, comprising: feeding fibers into an annular mold as a plurality of interconnected ringlets, each such ringlet laying in a substantially radial/circumferential plane in the mold; moisturizing the fibers in the annular mold with a liquid binder; compressing the moisturized fibers, forming a compressed annular mat; needling the compressed annular mat, displacing certain of the moisturized fibers from the ringlets in the radial/circumferential plane into axial direction; and densifying the needled compressed annular mat by chemical vapor infiltration (CVI).

DESCRIPTION OF THE DRAWINGS

For a complete understanding of the objects, techniques and structure of the invention reference should be made to the following detailed description and accompanying drawings wherein:

FIG. 1 is a flow chart of the process of the invention;

FIG. 2 is a top plan view of the fibers laid into the annular mold of FIG. 1; and FIG. 3, comprising FIGS. 3A, 3B and 3C, respectively shows felting needles used in the process of the invention.

BEST MODE FOR CARRYING OUT THE INVENTION

Referring now to the drawings and more particularly FIG. 1, it can be see that a system for making carbon/carbon composite discs in accordance with the invention is designated generally by the numeral 10. The system 10 includes a spool of fiber 12 which, in accordance with the invention, may be either precarbonized or carbonized PAN, pitch, or a combination of PAN and pitch fibers. The fibers of the spool 12 are fed through a feed tube 14 such that fiber strands 16 are deposited within an annular mold 18 received upon a rotating carousel 20. While it is preferred that the fiber strands be continuously fed from the spool 12 and through the feeding tube 14, the invention also contemplates that the strands may be chopped or cut while fed, such that varied lengths of fiber strands may be introduced into the mold 18, rather than continuous strands. The carousel 20 rotates in the direction of the arrow 22, while the feeding tube 14 is caused to reciprocate in a back and forth motion in the direction of the arrows 24. The concurrent rotation of the annular mold 18 with the reciprocation of the feeding tube 24 results in a nutation of the fiber strands 16 as they are deposited into the mold 18, such that the strands are laid into the mold in small rings or ringlets. In other words, and as shown in FIG. 2, a plurality of ringlets 26 are deposited within the larger ring defined by the annular mold 18. These small rings or ringlets align in a generally radial/circumferential plane, such that the fiber strands are found within the mold 18 in stratified layers. There is little, if any, placement of the fiber strands in an axial direction within the mold 18.

Those skilled in the art will appreciate that the fiber strands 16 are fed continuously into the mold 18 until a sufficient mass or volume is received therein. At that time, the feeding of the strands 16 is terminated. The continuous strands 16 are cut at the end of the feeding tube 14, and the annular mold 18 is removed for further processing. As shown, mold 18 is next placed beneath spray heads 28, through which water is sprayed onto the array of stratified layers of circularly arranged ringlets of fibers. The water serves as a sacrificial binder and a lubricant for the fibers for further processing. While it is contemplated that a binder and/or lubricant other than water may be employed, it is generally preferred that the binder be sacrificial, by which it is meant that the binder evaporates or is otherwise removed from the fibers during the further processing. With the water introduced onto the fibers in the mold 18, an annular press 30 is brought into contacting engagement with the fibers within the mold 18 to compress the same into a moisturized compressed mat or preform of such fibers 32. The mat or preform 32 is then placed upon a carousel or rotating plate 34, rotating in the direction of the arrow 36.

The carousel 32 is positioned beneath a reciprocating needle board 38, from which extend a plurality of barbed needles such as felting needles 40. The needle board 38 and associated needles 40 are caused to reciprocate in the direction of the arrow 42. The reciprocating action drives the needles 40 into and out of the mat or preform 32 on each reciprocating action. In the preferred embodiment of the invention, the stroke of the needle board 38 is sufficient that each of the needles 40 pierces completely through the thickness of the mat or preform 32 and then is completely removed therefrom on the return stroke.

As shown in FIG. 3, the needles of the needle board 38 may take any of various configurations such as shown by the needles 44, 46 and 48. The needle 44 is characterized by a plurality of downwardly extending barbs 44a. In like manner, the barbed needles 46 are characterized by upwardly extending barbs 46b. Finally, the needle 48 is characterized by downwardly extending barbs 48a and upwardly extending barbs 48b. Those skilled in the art will appreciate that the purpose of the barbs 44 is to engage the fibers within the mat or preform 32 and to drive them in an axial direction within that structure. Depending upon the direction of the barbs, this grabbing and driving action occurs in either the downstroke or the upstroke. The barbs of the felting needles 44 reorient the fibers in the downstroke, those of the needles 46 in the upstroke, and the needles 48 in both directions, as a consequence of the presence of barbs oriented in two directions.

It has been found that the presence of a liquid binder on the fibers 16 within the moisturized, compressed mat or preform 32, as well as the presence of the fibers in stratified ringlets, allows the needling of the fibers. It has been found that the liquid binder serves as a lubricant, allowing the fibers to flow across each other. It has also been found that the provision of the fibers in the small ringlets allows each ring to serve as a tiny spool, from which fiber is fed during its axial movement. As a consequence, the fiber has some "give" or slack, which, when coupled with the lubrication of the liquid binder, allows the fiber to move axially without breaking. It will be appreciated that when the felting needs 44, 46 are employed, the needling operation will be undertaken from one side of the mat or preform 32 and then the mat or preform will be flipped over such that the needling can take place from the opposite side—assuring an interwoven structure of the fibers driven axially into the mat or preform 32 from both directions. It will also be appreciated, when using the felting needle 48, the step of turning over the mat or preform 32 is not required, since the oppositely disposed barbs 48a and 48b achieve the desired results.

As a consequence of the needling operation just described, there is a resulting needled mat or preform 50 formed interlockingly by radially, circumferentially, and axially oriented fibers within the mat or preform itself. In effect, the fibers have assumed a three dimensional characteristic within the mat or preform. Accordingly, it is desired that the needling of the mat or preform 32 continue sufficiently to assure that the needled mat or preform 50 includes fibers which are radially, circumferentially, and axially oriented, and which is of a desired final thickness.

The needled mat or preform 50 is then passed to a densifier 52, where it undergoes chemical vapor infiltration whereby carbon is deposited on the surface of the fibers, within all the voids of the mat or preform 50, to form a substantially solid homogeneous carbon mass defining the densified disc 54, substantially absent of voids and the like. At the end of the chemical vapor infiltration processes, the densified disc 54 is removed from the densifier 52 and machined such that the disc can then be used for its designed application.

It can thus be seen that the concept of the invention allows for a resulting disc which is totally of carbon construction. The water, or other sacrificial binder/lubricator substantially evaporates from the mat or preform 50 during processing and, at the very least, during the densifying process. As a result, the brake discs manufactured in accordance with this process are substantially 100% carbon.

Thus it can be seen that the objects of the invention have been satisfied by the structure and process presented above. While in accordance with the patent statutes only the best mode and preferred embodiment of the invention is presented and described in detail, the invention is not limited thereto or thereby. Accordingly, for an appreciation of the true scope and breadth of the invention reference should be made to the following claims.

What is claimed is:

1. A method for making carbon/carbon composite discs for aircraft brakes, comprising:

feeding fibers into a mold;

introducing a binder onto said fibers in the mold;

compressing the said fibers in the mold to form a compressed mat;

reciprocatingly driving needles into the compressed mat; and densifying the needled compressed mat by chemical vapor infiltration.

2. The method for making carbon/carbon composite discs for aircraft brakes according to claim 1, wherein said fibers are fed in rings into the mold, the rings substantially laying in a radial/circumferential plane in the compressed mat.

3. The method for making carbon/carbon composite discs for aircraft brakes according to claim 2, wherein said reciprocatingly driving needles into the compressed mat reorients certain portions of said fibers into axial direction in the compressed mat.

4. The method for making carbon/carbon composite discs for aircraft brakes according to claim 3, wherein said binder is a liquid.

5. The method for making carbon/carbon composite discs for aircraft brakes according to claim 4, wherein said binder is a sacrificial binder.

6. The method of making carbon/carbon composite discs for aircraft brakes according to claim 5, wherein said binder is water.

7. The method for making carbon/carbon composite discs for aircraft brakes according to claim 4, wherein said needles have barbs thereon, said barbs engaging certain of said fibers for reorienting said certain portions of said fibers into said axial direction.

8. The method for making carbon/carbon composite discs for aircraft brakes according to claim 7, wherein said fibers are PAN fibers.

9. The method for making carbon/carbon composite discs for aircraft brakes according to claim 7, wherein said fibers are pitch fibers.

10. A method for making carbon/carbon composite discs for aircraft brakes, comprising:

feeding fibers into an annular mold as a plurality of interconnected ringlets, each such ringlet laying in a substantially radial/circumferential plane in the mold;

moisturizing the fibers in the annular mold with a liquid binder;

compressing the moisturized fibers, forming a compressed annular mat;

needling the compressed annular mat, displacing certain of the moisturized fibers from the ringlets in the radial/circumferential plane into axial direction; and densifying the needled compressed annular mat by chemical vapor infiltration.

11. The method for making carbon/carbon composite discs for aircraft brakes according to claim 10, wherein said needling operation reorients certain of said moisturized fibers in a first direction and others of said moisturizing fibers in a second direction.

12. The method for making carbon/carbon composite discs for aircraft brakes according to claim 11, wherein said fibers are a combination of PAN and pitch fibers.

* * * * *